United States Patent
Wang et al.

(10) Patent No.: US 12,525,889 B1
(45) Date of Patent: Jan. 13, 2026

(54) DUAL-STAGE AC TO AC ELECTRIC POWER CONVERTERS

(71) Applicant: Rampx Holdings, Inc., Coquitlam (CA)

(72) Inventors: Jiacheng Wang, Coquitlam (CA); Shuai Wang, Abbotsford (CA)

(73) Assignee: Rampx Holdings, Inc., Coquition (CA)

( * ) Notice: Subject to any disclaimer, the term of this patent is extended or adjusted under 35 U.S.C. 154(b) by 0 days.

(21) Appl. No.: 19/260,414

(22) Filed: Jul. 4, 2025

Related U.S. Application Data

(63) Continuation of application No. PCT/IB2025/000021, filed on Jan. 18, 2025.

(60) Provisional application No. 63/552,856, filed on Feb. 13, 2024.

(51) Int. Cl.
  *H02M 5/293* (2006.01)
  *H02M 1/12* (2006.01)
  *H02M 5/22* (2006.01)

(52) U.S. Cl.
  CPC ......... *H02M 5/2932* (2021.05); *H02M 1/126* (2013.01); *H02M 5/225* (2013.01)

(58) Field of Classification Search
  CPC ..... H02M 5/2932; H02M 1/126; H02M 5/225
  See application file for complete search history.

(56) References Cited

U.S. PATENT DOCUMENTS

| | | | |
|---|---|---|---|
| 9,678,519 B1 * | 6/2017 | Alexander | ................ G05F 1/10 |
| 2006/0126318 A1 | 6/2006 | Mechi | |
| 2012/0163045 A1 | 6/2012 | Fujita | |
| 2013/0201733 A1 | 8/2013 | Divan | |

FOREIGN PATENT DOCUMENTS

JP  2023129106  9/2023

OTHER PUBLICATIONS

"Notification of Transmittal of the International Search Report and the Written Opinion of the International Searching Authority or the Declaration," Apr. 11, 2025.

* cited by examiner

*Primary Examiner* — Adolf D Berhane
(74) *Attorney, Agent, or Firm* — Law Office of Carl Giordano, PC

(57) ABSTRACT

The disclosed family of electrical power converters consists of two multiphase semiconductor conversion stages to accomplish variable voltage and variable frequency (VVVF) AC-AC power conversion. A middle filter network is positioned between the two conversion stages to absorb high-frequency harmonic currents produced by converter switching and to provide a freewheel path for inductive output currents. Additionally, an input filter network is placed at the input terminals of the first conversion stage to minimize input current distortion, while an output filter network is located at the output terminals of the second conversion stage to suppress high-frequency harmonics in the output currents. Moreover, the disclosed converter family is generalized for N-phase to M-phase power conversion, where N≥3 and M≥3.

17 Claims, 17 Drawing Sheets

DUAL-STAGE AC TO AC ELECTRIC POWER CONVERTERS

CROSS-REFERENCE TO RELATED APPLICATIONS

This application claims priority to and the benefit of, the earlier filing date, of as a Continuation application, of patent application serial number IB/2025/000021 filed on Jan. 18, 2025, which claimed priority to and the benefit of, under 35 U.S.C. 119 (e), U.S. Provisional Application No. 63/552,856, Dual-Stage AC to AC Electrical Power Converters filed on Feb. 13, 2024, the entire disclosure of which is hereby incorporated by reference herein.

BACKGROUND OF THE INVENTION

Numerous circuit topologies have been developed for variable voltage variable frequency (VVVF) AC-AC power conversion across multiple applications, including industrial motor drives, wind energy generation, electric road vehicles, aerospace and aviation systems, and marine vessels. In many of these applications, particularly those involving AC electric motors or generators, multiphase electric drives offer distinct advantages over conventional three-phase drives. These benefits include reduced phase currents without an increase in per-phase voltage, lower torque pulsation, higher torque density, and enhanced fault tolerance, stability, and redundancy. As a result, there is a growing demand in the industry to develop advanced multiphase (N≥3) AC-AC power converter topologies suitable for such applications.

Currently, the two main categories of circuit topologies for AC-AC power conversion are back-to-back AC-DC-AC converters and AC-AC matrix converters. Back-to-back converters can be further classified into voltage source converters and current source converters, under which many two-level or multi-level topological configurations have been developed.

In back-to-back power converters, a DC energy storage element is indispensable. Voltage source converters require electrolytic capacitors installed in their DC stage and current source converters need DC inductors to properly function. Electrolytic capacitors have several major drawbacks, including large size, considerable leakage current, high equivalent series resistance, poor reliability, and limited lifetime, with an added risk of fire or explosion. These limitations adversely affect the power density, efficiency, and overall reliability of voltage source converters. More recently, film DC capacitors have been adopted in certain applications utilizing voltage source converters, such as photovoltaic solar inverters, to enhance equipment reliability and extend lifespan. While they offer significantly greater reliability compared to electrolytic capacitors, they come at a much higher cost and still require a substantial amount of space. Similarly, the large DC inductors required for current source converters hinder their ability to achieve high efficiency and miniaturization, due to the inductors' bulkiness and associated conduction losses.

AC-AC matrix converters have been proposed and investigated for decades as a solution to the drawbacks of back-to-back AC-DC-AC converters. By eliminating DC energy storage elements and enabling direct AC-AC power conversion, they offer the potential for greater efficiency and compactness in a range of products and equipment. However, there remain major hurdles to their widespread adoption in real-world applications. While bulky energy storage components are removed, matrix converters require bidirectional power semiconductor switches, which can obstruct the inductive load current path and potentially cause overvoltage damage to the power semiconductors. These bidirectional switches also introduce additional complexities in gate drive circuit design and power circuit layout. Moreover, traditional matrix converters are limited by a lower source-to-load voltage transfer ratio compared to back-to-back AC-DC-AC converters.

Therefore, there is a need for improved multiphase AC-AC converter topologies capable of operating without energy storage elements while providing a freewheel path for inductive load currents to prevent overvoltage damage to power semiconductors. Such improvements would lead to higher efficiency, reliability, and power density.

SUMMARY

The objective of the present disclosure is to introduce a family of bidirectional electrical power converter topologies designed for effective use in multiphase (N≥3) to multiphase (M≥3) AC-AC power conversion.

In accordance with an embodiment of the invention, the disclosed converters comprise two semiconductor conversion stages with a middle filter network positioned between them. In conventional back-to-back AC-DC-AC converters, the input AC voltages are first converted to constant DC quantities through a pulse width modulation (PWM) switching scheme, during which their magnitude is either increased or decreased. However, in the disclosed converters, the first-stage converter continuously transforms the multiphase AC input voltages into an intermediate stage of multiphase voltages, which may be either AC or DC, using active switches. This is achieved by arranging the input voltages in descending order, resulting in the first-stage converter outputs being piecewise functions of the input voltages. With active switches equipped in the converter legs the power conversion can be bidirectional. If certain active switches in the first stage are replaced with diodes, the converter operates with unidirectional power flow transferring power only from the AC inputs to the intermediate stage.

The second conversion stage employs active switches to transform the N intermediate voltages to multiphase AC output voltages (M≥3). These active switches can be operated by PWM switching schemes to chop the piecewise intermediate voltages to generate the desired controllable high frequency PWM AC output voltages. Simultaneously, controllable high frequency PWM currents are delivered at the input terminals of the second-stage converter.

A controller is utilized to process the sampled input voltages and/or output currents of the AC-AC converter, implementing a switching and/or control scheme to produce real-time gate signals for both the first- and second-stage converters. This allows key parameters of the converter, such as output voltages and input currents, to be generated and/or regulated according to their reference values.

The middle filter network is positioned between the two converter stages to absorb high frequency harmonics in the PWM currents, while still allowing low frequency currents to pass through the first-stage converter. Because the voltage stiff points for the first-stage converter are provided by the input AC voltage source, no energy storage element is required in the middle filter network to support any voltage stiff points. Therefore, the filter network which can be constructed using various combinations of passive components, serves solely the purpose of filtering. The capacitors and resistors in the middle filter network also create a freewheel path for inductive load currents when all active switches in the converters are turned off. This provides reliable protection for the power semiconductors, preventing them from being damaged by potential high voltage spikes.

BRIEF DESCRIPTION OF THE DRAWINGS

The subject matter of the invention is explained in more detail in the following text with reference to exemplary embodiments which are illustrated in the attached drawings.

DETAILED DESCRIPTION OF THE INVENTION

Figure 1A:
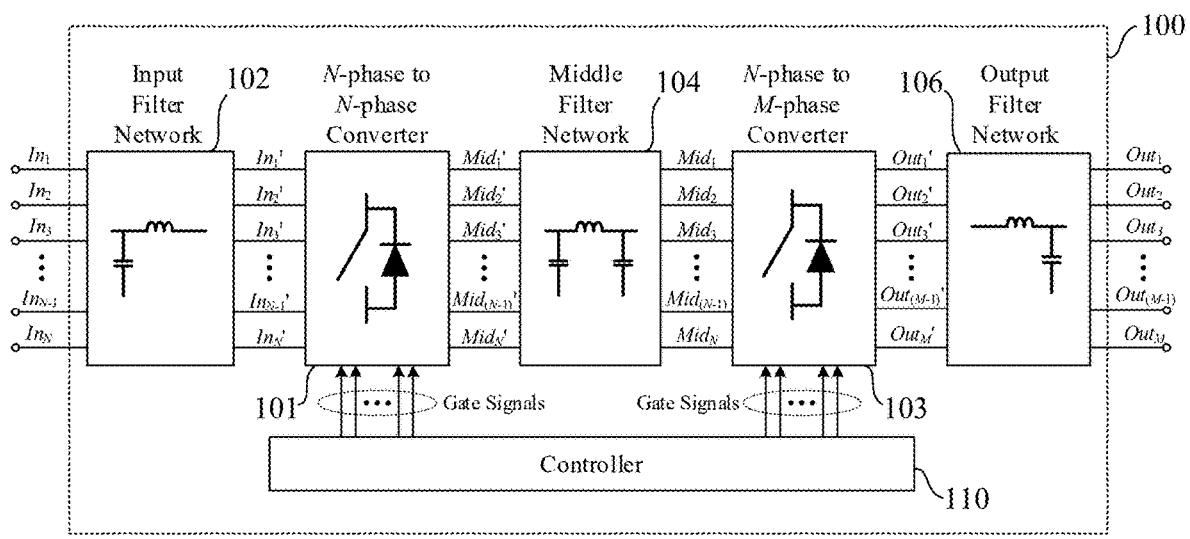
FIGS. 1 and 1A are views of two exemplary equivalent circuits, wherein the diagrams show a generalized bidirectional multiphase to multiphase converter according to an embodiment of the invention.

With reference to the figures, several embodiments or implementations are described below in conjunction with the drawings, where like reference numerals indicate like elements throughout. It should be noted that the various features may not be drawn to scale. The described power converters 100 can interface with various types of sources and loads, including grids, generators, or motors. However, the concepts of the invention are not limited to any specific application.

Figure 1:
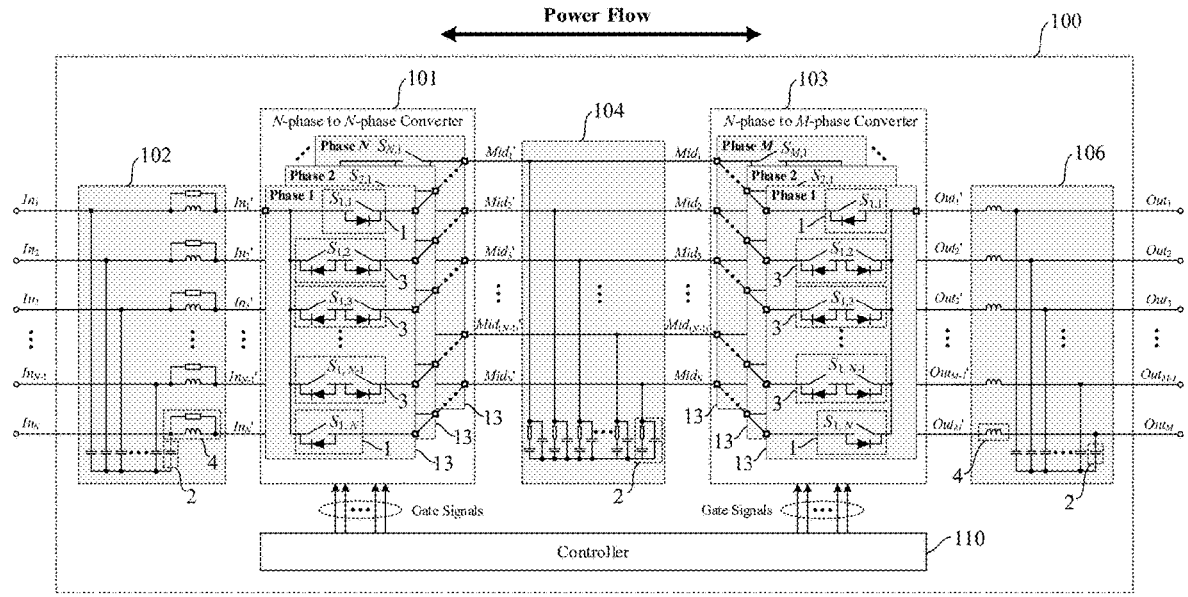

FIG. 1A illustrates a generalized block diagram on an exemplary N-phase to M-phase bidirectional AC-AC power converter in accordance with the principles of the invention. FIG. 1 shows a further detailed schematic diagram of the exemplary N-phase to M-phase bidirectional AC-AC electrical power converter 100 shown in FIG. 1A. As illustrated in the exemplary embodiment of the AC-AC converter 100 comprises two converter stages 101 and 103 in the form of an N-phase to N-phase first-stage converter 101 followed by an N-phase to M-phase second-stage converter 103, wherein N and M are integer numbers and N≥3 and M≥3.

The power converter 100 in FIG. 1 has N input terminals ($In_1$, $In_2$, ..., $In_N$) for interfacing an N-phase AC electrical grid or generator, and M output terminals ($Out_1$, $Out_2$, ... $Out_M$) which for example may be connected to an M-phase AC motor or electrical grid.

The first-stage converter 101 also has N-phase AC inputs ($In_1'$, $In_2'$, ..., $In_N'$) which are connected via an input filter network 102 with the inputs ($In_1$, $In_2$, ..., $In_N$) of 100, and has N-phase outputs ($Mid_1'$, $Mid_2'$, ..., $Mid_N'$), either AC or DC, that also serve as the inputs of the middle filter network.

The first-stage converter 101 comprises N N-level bridge legs 13, one on each of the converter's N phases, which for example comprises two active switches 1 ($S_{1,1}$ and $S_{1,N}$) configured in the form of a half bridge circuit and connected to the top and bottom nodes on the input side of the middle filter ($Mid_1'$ and $Mid_N'$), and N-2 bidirectional active switches 3 ($S_{1,2}$, $S_{1,3}$, ..., $S_{1,N-1}$), connected respectively to the other input nodes of the middle filter ($Mid_2'$, $Mid_3', \ldots, Mid_{(N-1)}'$). The input of the nth N-level bridge leg 13 is connected to the nth phase input node ($In_n'$) of the first-stage converter 101, wherein $1 \leq n \leq N$.

The outputs ($Mid_1', Mid_2', \ldots, Mid_N'$) of the first-stage converter 101 are connected to the inputs of the middle filter network 104, which for example comprises an N-phase circuit network of capacitors and resistors.

The outputs ($Mid_1, Mid_2, \ldots, Mid_N$) of the middle filter network 104 are connected to the inputs of the second-stage converter 103, which in the embodiment of FIG. 1 comprises M N-level bridge legs 13, which for example comprises two active switches 1 ($S_{1,1}$ and $S_{1,N}$) configured in the form of a half bridge circuit and connected to the top and bottom nodes ($Mid_1$ and $Mid_N$) on the output side of the middle filter network, and N-2 bidirectional active switches 3 ($S_{1,2}, S_{1,3}, \ldots, S_{1,N-1}$), connected respectively to the other output nodes of the middle filter ($Mid_2, Mid_3, \ldots, Mid_{(N-1)}$). The output of the mth N-level bridge leg 13 is connected to the mth phase output node ($Out_m'$) of the second-stage converter 103, wherein $1 \leq m \leq M$.

The outputs ($Out_1', Out_2', \ldots, Out_M'$) of the second-stage converter 103 are also the inputs of the output filter network 106, which for example comprises an M-phase network of inductors, resistors, and capacitors. The outputs ($Out_1, Out_2, \ldots, Out_M$) of the output filter network 106 also serve as the outputs of the entire converter 100.

Figure 2:
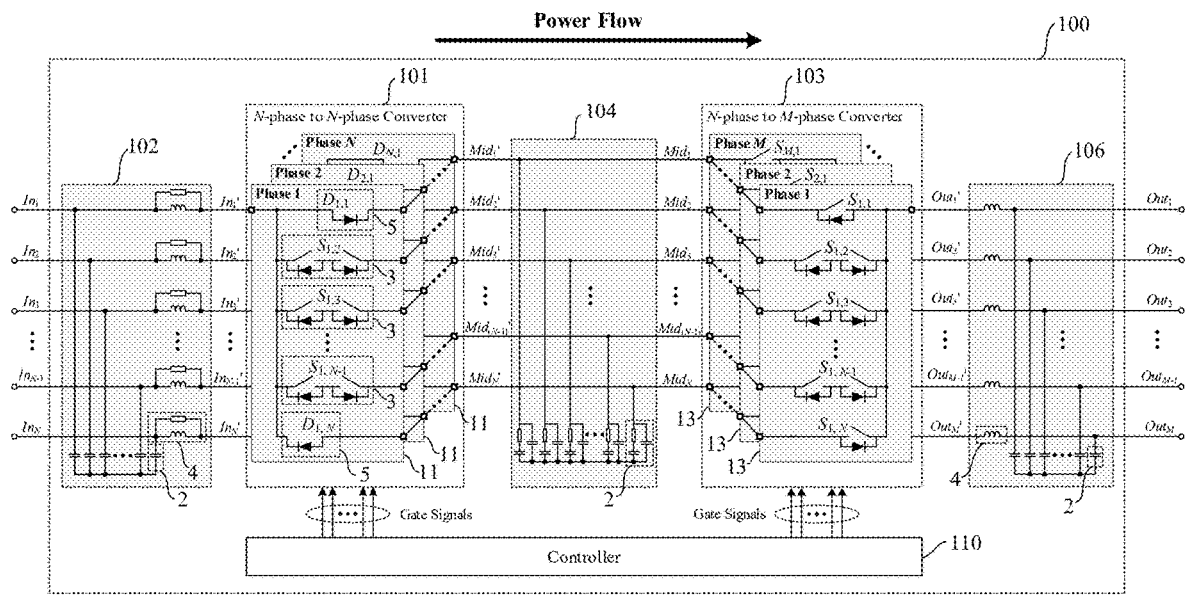
FIG. 2 is a schematic diagram showing a generalized unidirectional multiphase to multiphase converter according to an embodiment of the invention.

FIG. 2 shows an exemplary N-phase to M-phase unidirectional AC-AC electrical power converter 100, in which the active switches ($S_{1,1}$ and $S_{1,N}, S_{2,1}$ and $S_{2,N}, \ldots, S_{N,1}$ and $S_{N,N}$) in the half bridge parts of the bridge legs of the first-stage converter 101 are replaced with diodes ($D_{1,1}$ and $D_{1,N}, D_{2,1}$ and $D_{2,N}, \ldots, D_{N,1}$ and $D_{N,N}$) 5.

Figure 3A:
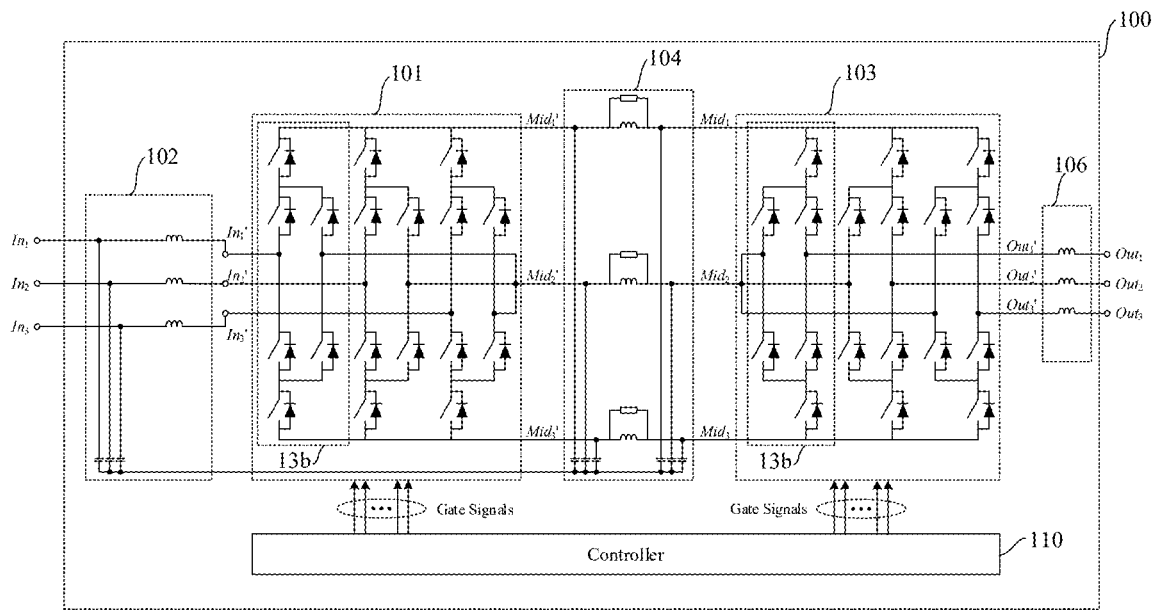
FIGS. 3A, 3B, and 3C, are schematic diagrams illustrating bidirectional three-phase to three-phase converters and unidirectional three-phase to three-phase converters according to an embodiment of the invention.
Figure 3B:
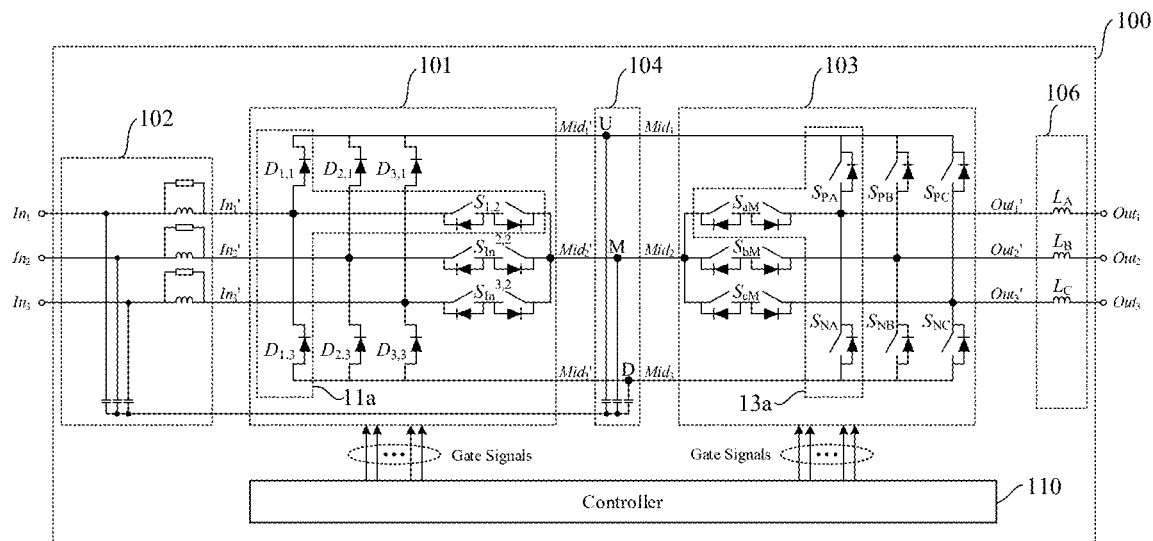
Figure 3C:
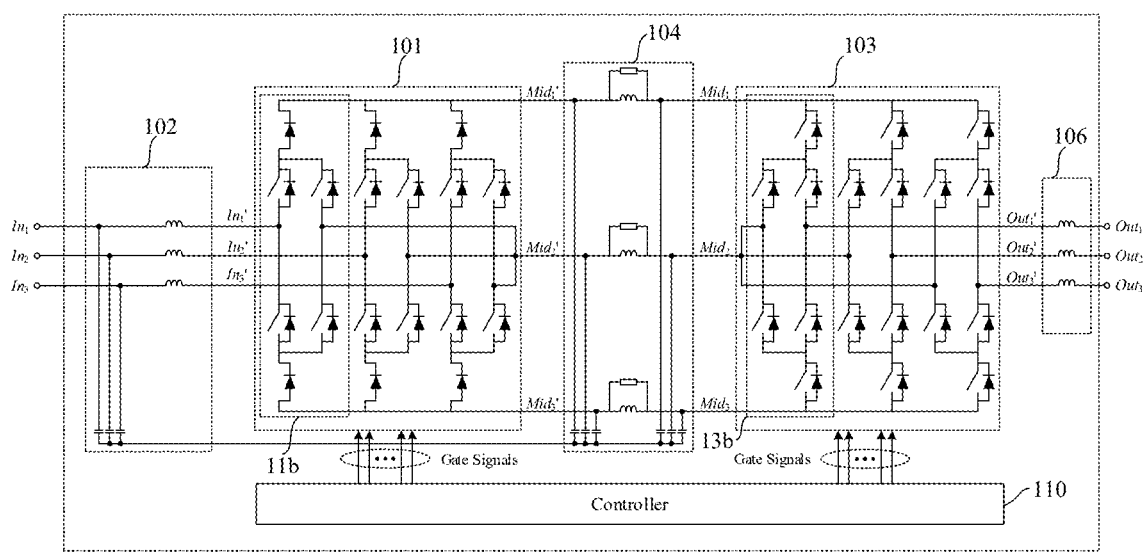

FIGS. 3A and 3B illustrate two exemplary 3-phase to 3-phase bidirectional AC-AC power converter 100 with 3-level bidirectional T-type bridge legs 13a and with 3-level bidirectional active neutral point clamped (ANPC) bridge legs 13b, respectively, and FIGS. 3C and 3D show two exemplary 3-phase to 3-phase unidirectional AC-AC power converter 100 with 3-level unidirectional T-type bridge legs 11a and with 3-level unidirectional ANPC bridge legs 11b, respectively.

Figure 4A:
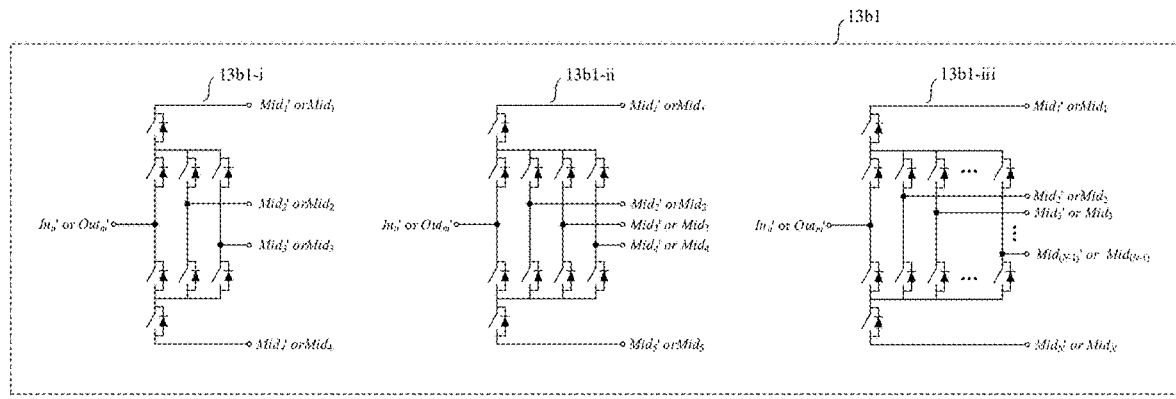
FIGS. 4A, 4B, and 4C are schematic diagrams showing embodiments of 1-phase to N-phase bridge legs employing only active switches in an N-phase to N-phase converter as the first-stage converter or an N-phase to M-phase converter as the second-stage converter in a generalized bidirectional multiphase to multiphase converter according to an embodiment of the invention.
Figure 4B:
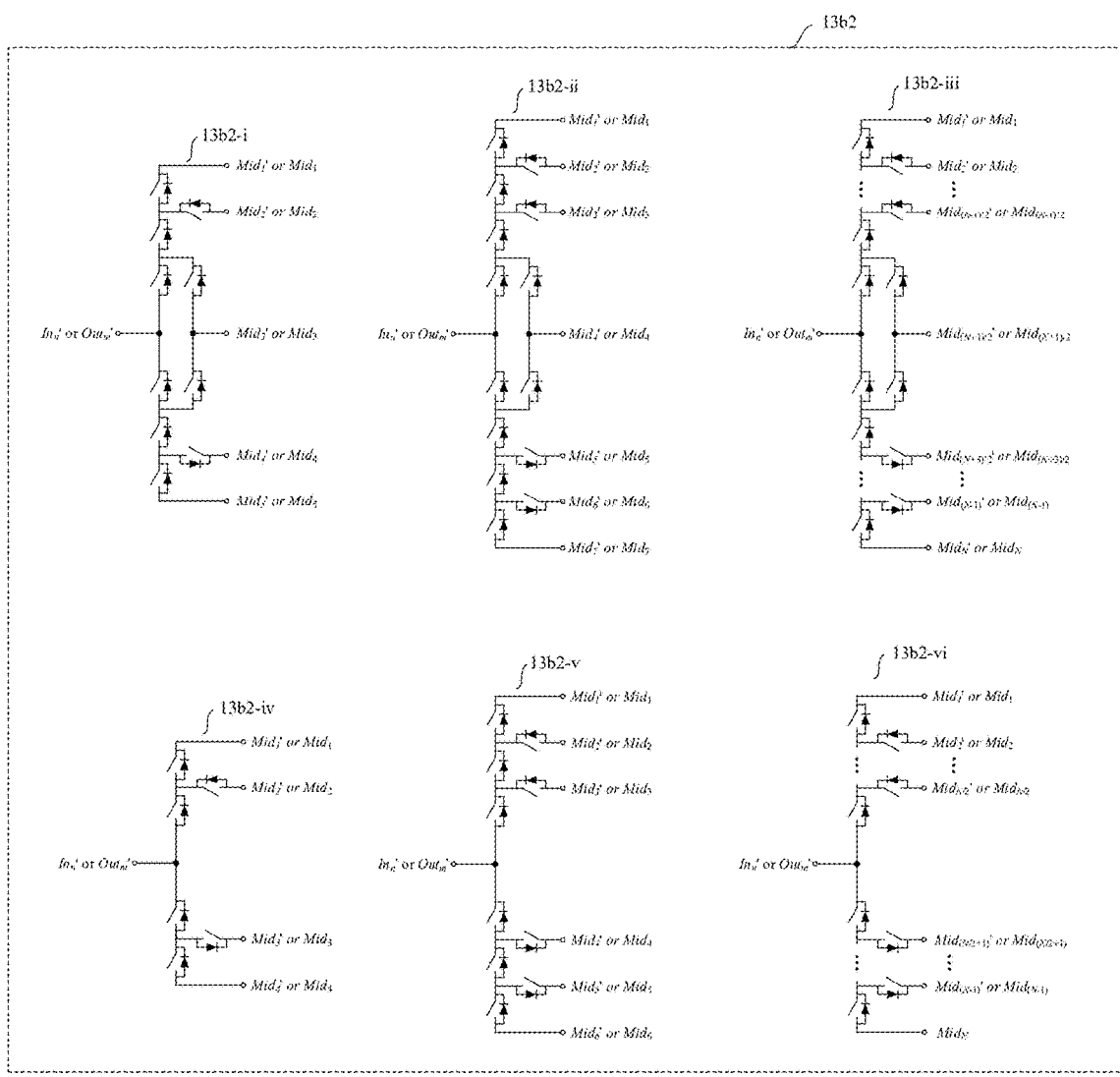
Figure 4C:
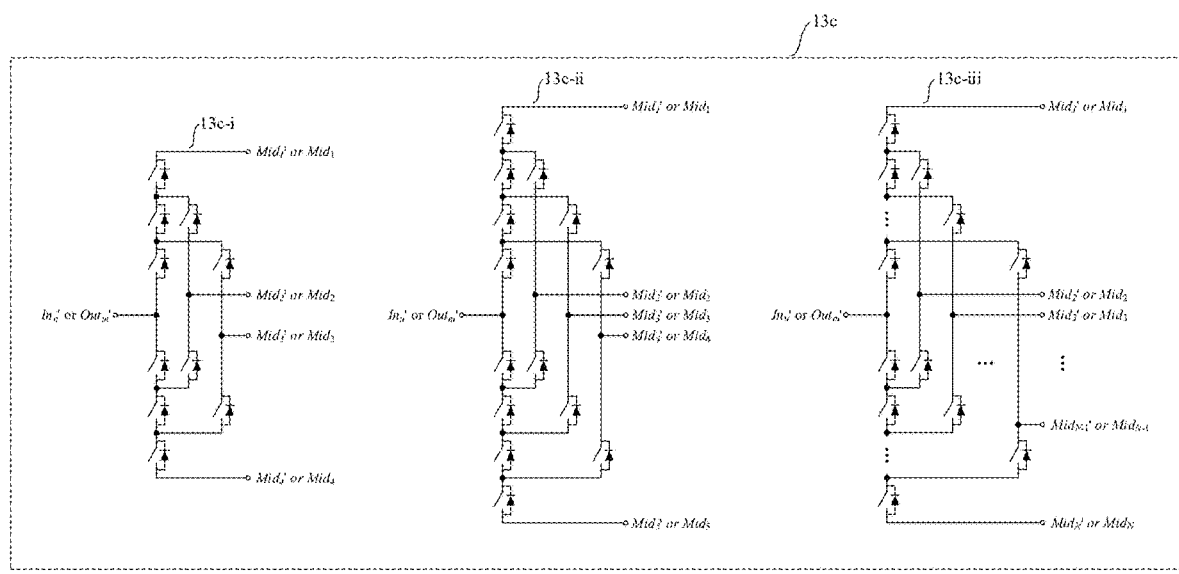

FIGS. 4A, 4B, and 4C show respectively one group of bidirectional N-level bridge leg variants 13b1, 13b2, and 13c with all active switches, which may be used in the first-stage converter 101 and the second-stage converter 103 in FIG. 1.

The first two groups of bridge leg variants 13b1 and 13b2 are derived from the 3-level bidirectional ANPC bridge leg 13b as shown in FIG. 3A. The original 3-level ANPC bridge leg 13b comprises four active switches in series on the main leg, in which the top switch is connected to the node ($Mid_1'$ or $Mid_1$), the bottom switch is connected to the node ($Mid_3'$ or $Mid_3$), the two middle switches together with an additional two switches forming a two-leg full bridge circuit positioned between the top switch and the bottom switch, with the output terminal of the first leg of the full bridge connected to the node ($In_n'$ or $Out_m'$), where $1 \leq n \leq N$ and $1 \leq m \leq M$, and the output terminal of the second leg of the full bridge connected to the node ($Mid_2'$ or $Mid_2$).

FIG. 4A shows the first group of N-level bridge leg variants 13b1 comprising 2 N active switches ($N \geq 4$), wherein the main leg of all the variants comprises the same four switches in series as those in 13b, and additional half bridges are paralleled with the middle two switches in the main leg to form multi-leg full bridges positioned between the top switch and bottom switch of the main leg. For example, by adding one and two more half bridges in parallel with the full bridge part of the original ANPC bridge leg, 4-level 13b1-i and 5-level 13b1-ii versions of bridge legs of this group are created. By paralleling more half bridges to the multi-leg full bridge part a generalized N-level bridge leg 13b1-iii is derived, in which the top switch connects to the node ($Mid_1'$ or $Mid_1$), the bottom switch connects to the node ($Mid_N'$ or $Mid_N$), the N-1 half bridges in the middle form an (N-1)-leg full bridge circuit positioned between the top switch and bottom switch of the main bridge leg, where the output terminal of the first leg of the (N-1)-leg full bridge is connected to the node ($In_n'$ or $Out_m'$), and the output terminals of the other legs of the full bridge are connected respectively to the middle nodes ($Mid_2'$ or $Mid_2$, $Mid_3'$ or $Mid_3$, $\ldots$, $Mid_{(N-1)}'$ or $Mid_{(N-1)}$) of a multiphase converter 100.

FIG. 4B shows the second group of N-level bridge leg variants 13b2.

In the group of 13b2, when N is an odd number ($N \geq 5$), the bridge leg variants comprise 2 N active switches, including the same switches and configuration as those in an original 3-level ANPC bridge leg 13b in the middle of the bridge leg, plus extra half bridges connected to the top and bottom of the leg to create more levels. For example, a 5-level version 13b2-i is formed by connecting one additional half bridge to the top node of the 3-level ANPC bridge leg to create the nodes connected to ($Mid_1'$ or $Mid_1$) and ($Mid_2'$ or $Mid_2$), and another additional half bridge to the bottom node of the 3-level ANPC bridge leg to create the nodes connected to ($Mid_4'$ or $Mid_4$) and ($Mid_5'$ or $Mid_5$), whereas the two terminals of the full bridge in the middle of the ANPC bridge leg are connected to ($In_n'$ or $Out_m'$) and ($Mid_3'$ or $Mid_3$), respectively. More half bridges can be added to the structure to extend it to the 7-level version 13b2-ii, and further generalizing it to the N-level version 13b2-iii.

In the group of 13b2, when N is an even number ($N \geq 4$), the bridge leg variants comprise 2 N-2 active switches. Similar to the odd N cases, higher number of levels of the bridge leg are created by connecting additional half bridges to the top and bottom of the leg to introduce more connection points for interfacing the middle filter. The main difference is that in the full bridge part of the original ANPC leg, the half bridge that is paralleled with the middle two switches in the main leg in odd N cases is open, thereby creating two connection points here instead of one. This is as seen in the 4-level version 13b2-iv and 5-level version 13b2-v, which are further generalized to the N-level version 13b2-vi.

FIG. 4C illustrates the third group of bridge leg variants 13c which comprises 2(2 N-3) active switches. For example, a 4-level version in this group 13c-i has six active switches in series on the main leg, in which the top switch connects to the node ($Mid_1'$ or $Mid_1$), the bottom switch connects to the node ($Mid_4'$ or $Mid_4$), the center joint of the bridge leg connects to the node ($In_n$ or $Out_m$), where $1 \leq n \leq N$ and $1 \leq m \leq M$. Moreover, the bridge leg includes two additional two-switch half bridges, with their top nodes connected respectively to the joints between the $1^{st}$ and $2^{nd}$ switches and the $2^{nd}$ and $3^{rd}$ switches, and their bottom nodes connected respectively to the joints between the $4^{th}$ and $5^{th}$ switches and the $5^{th}$ and $6^{th}$ switches, forming two additional points to be connected to ($Mid_2'$ or $Mid_2$) and ($Mid_3'$ or $Mid_3$), respectively. With more switches added to the series branch on the main leg and more half bridges included, this bridge leg configuration can be extended to the 5-level version 13c-ii, and further generalized to the N-level version as shown in 13c-iii.

Figure 5A:
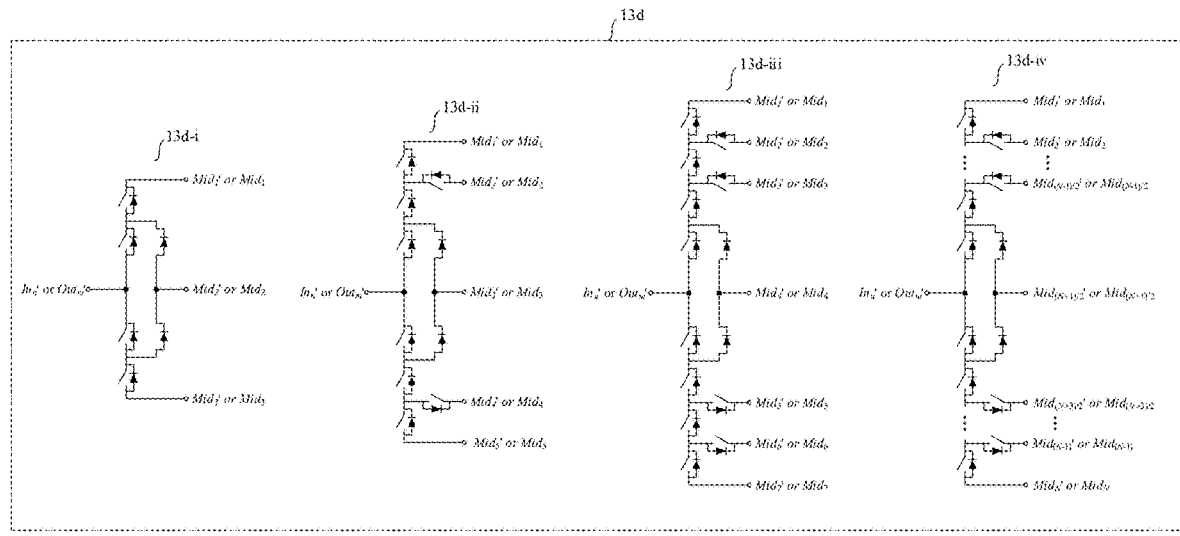
FIGS. 5A and 5B are schematic diagrams showing embodiments of 1-phase to N-phase converter bridge legs employing combinations of active switches and diodes in an N-phase to N-phase converter as the first-stage converter or an N-phase to M-phase converter as the second-stage converter in a generalized unidirectional multiphase to multiphase converter according to an embodiment of the invention.
Figure 5B:
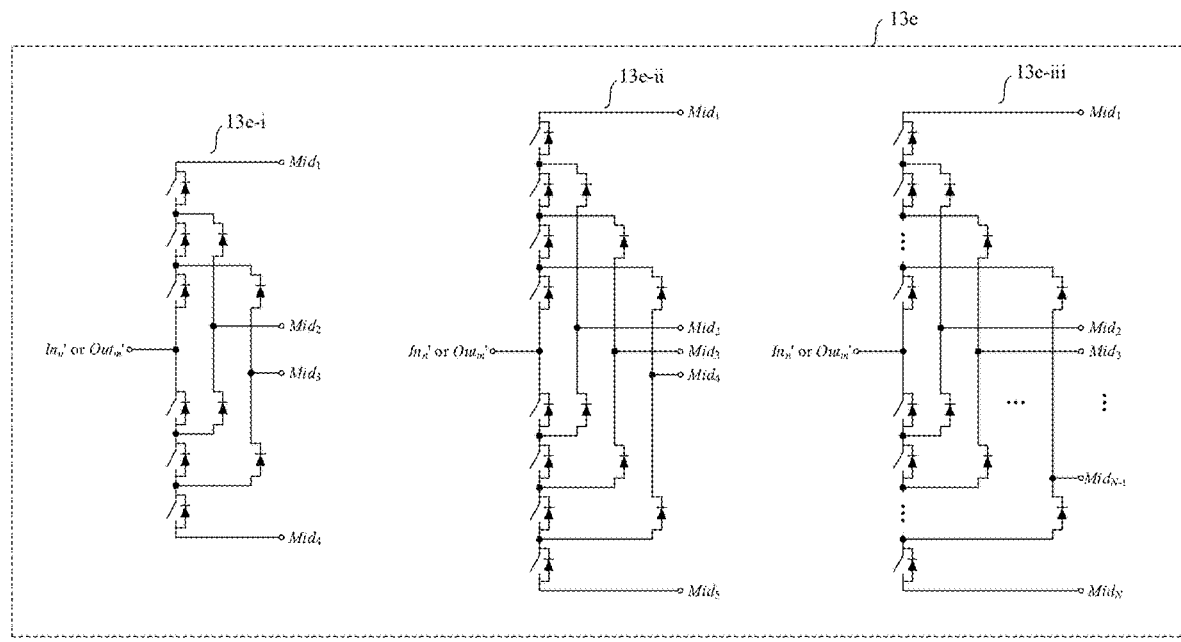

FIGS. 5A and 5B show further embodiments of bidirectional N-level bridge legs 13d, 13e, with combinations of active switches and diodes, which may be used in the first-stage converter 101 and the second-stage converter 103 in FIG. 1. These variants 13d, 13e are derived from the original 3-level neutral point clamped (NPC) bridge leg 13d-i, in which two diodes are installed in places of the two active switches on the half bridge paralleled with the middle switches in a 3-level ANPC bridge leg 13b.

FIG. 5A shows the fourth group of bridge leg variants 13d, in which the two active switches on the half bridge paralleled with the middle switches in the bridge legs of variants 13b2 are replaced with diodes when the number of levels N is odd.

FIG. 5B shows the fifth group of bridge leg variants 13e, in which the half bridges with active switches connected between the main bridge leg joints in the variants of group 13c are replaced with diode half bridges.

FIGS. 6A, 6B, 6C, and 6D show respectively one group of unidirectional N-level bridge leg variants 11b1, 11b2, 11b3, and 11c with combinations of active switches and diodes, which can be used to implement the first-stage converter 101 for the unidirectional converter in FIG. 2.

Figure 6A:
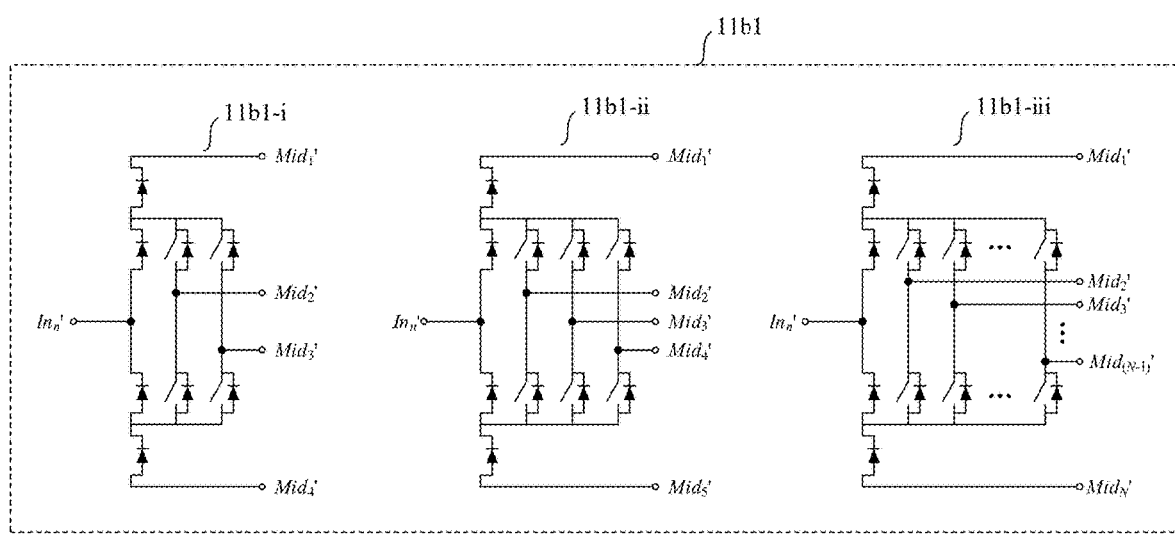
FIGS. 6A, 6B, 6C and 6D schematically show embodiments of 1-phase to N-phase converter bridge legs employing combinations of active switches and diodes in an N-phase to N-phase converter as the first-stage converter for a generalized unidirectional multiphase to multiphase converter according to an embodiment of the invention.
Figure 6B:
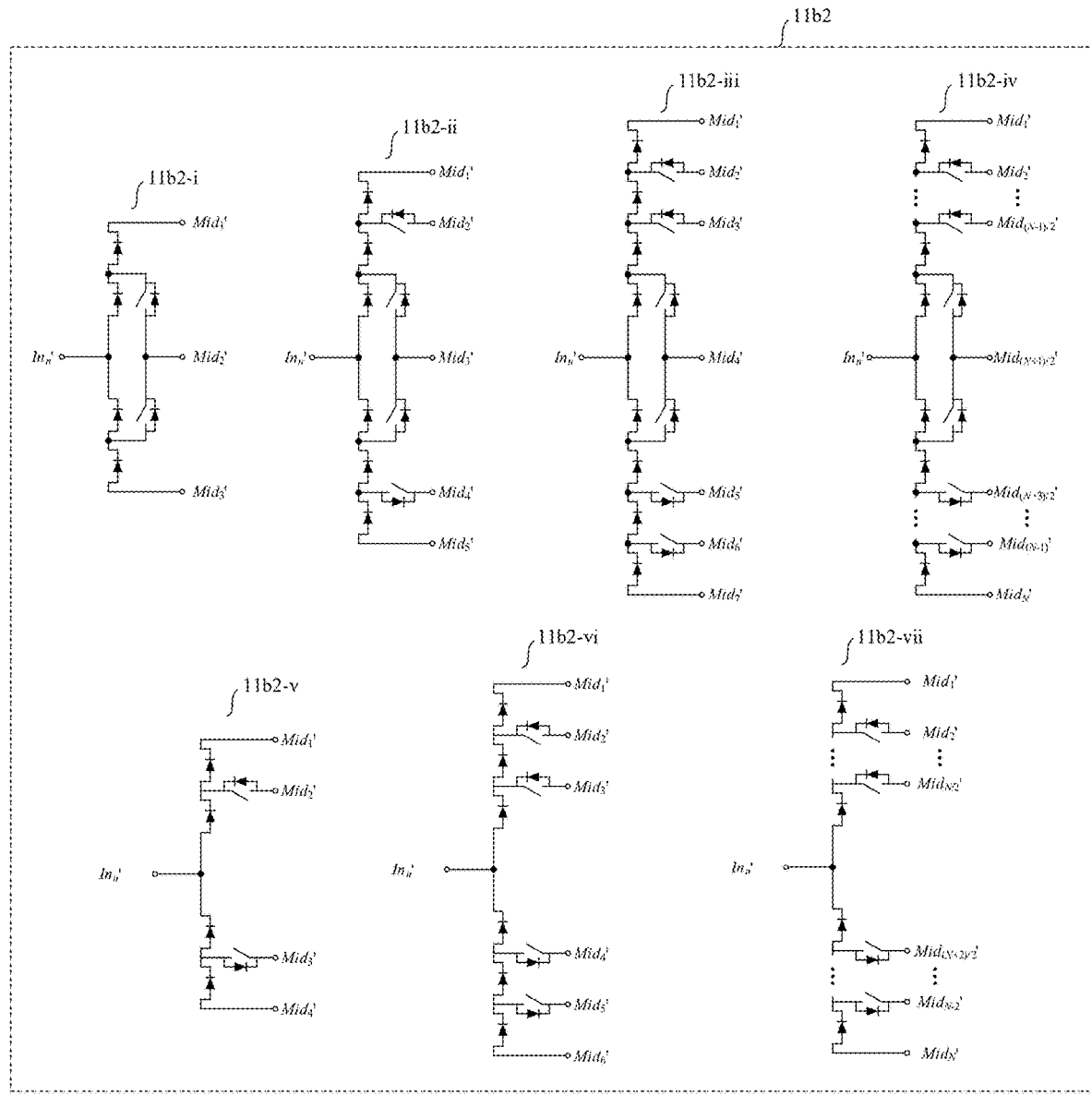
Figure 6C:
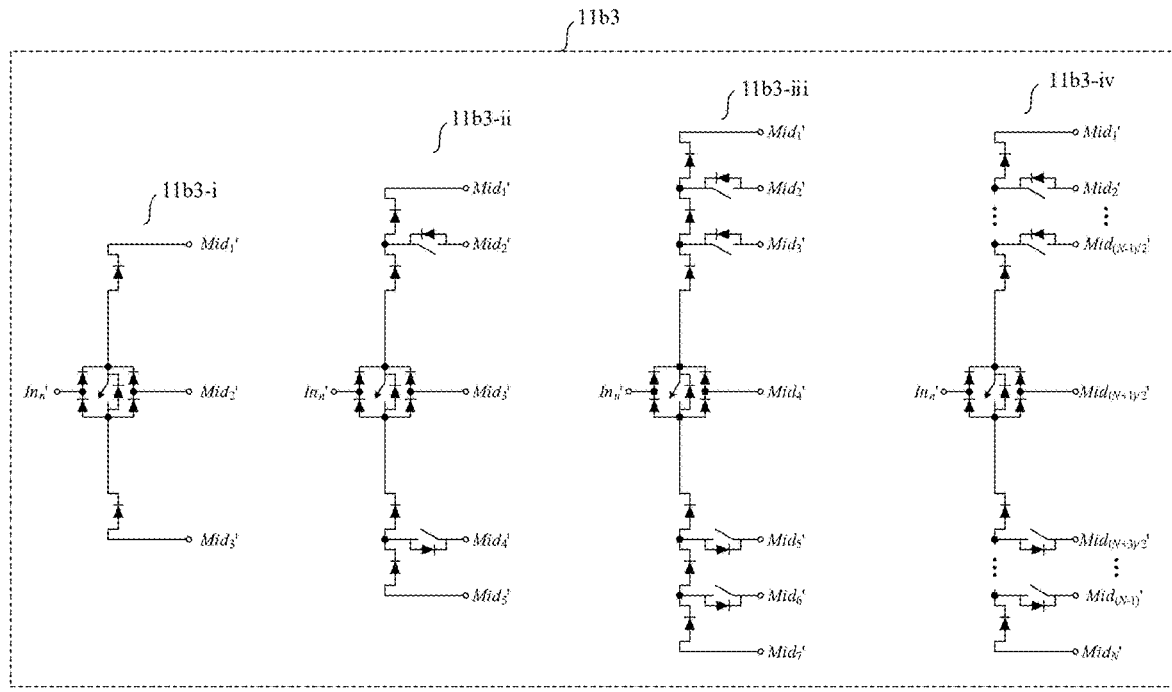
Figure 6D:
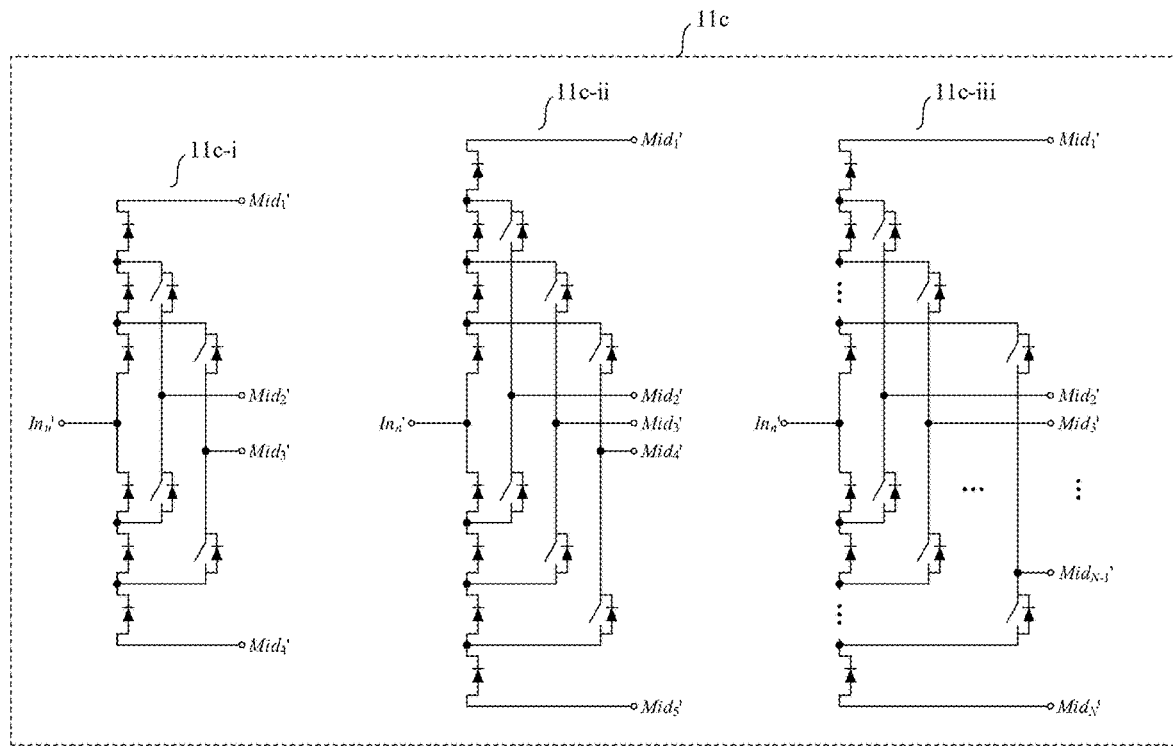

The unidirectional N-level bridge legs 11b1, 11b2, and 11c as shown in FIGS. 6A, 6B and 6D originate from the bidirectional N-level bridge legs 13b1, 13b2, and 13c as shown in FIGS. 4A, 4B and 4C, in which the active switches on the main legs are replaced with diodes. In FIG. 6C, an additional group of variants 11b3 which are similar to variants 11b2 when N is odd is shown. The main difference is that in 11b3, the active switch based full bridge in the variants of 11b2 is replaced by a diode based half bridge plus an active switch in the middle.

Figure 7A:
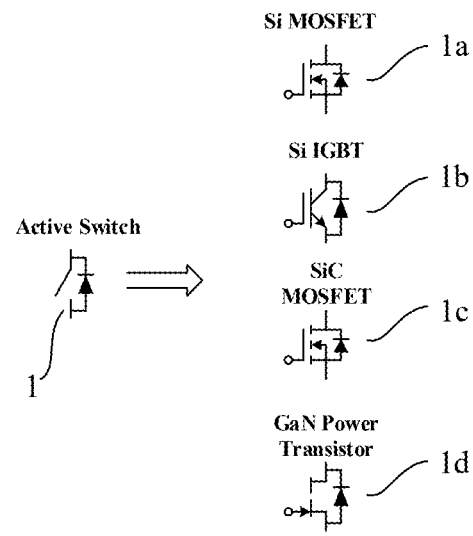
FIGS. 7A and 7B schematically show embodiments of active and bidirectional active switches formed by various power semiconductor devices that can be used in an electrical power converter according to an embodiment of the invention.

FIG. 7A shows exemplary two-quadrant active switches 1 that can be used in bridge legs of 13 and 11. The power converter 100 can employ any suitable type of switchable power devices including without limitation semiconductor-based switches such as insulated gate bipolar transistors (IGBTs), Si-based metal-oxide-semiconductor field-effect transistor (MOSFET), silicon carbide (SiC) MOSFET, Gallium Nitride (GaN) devices, power transistors and hybrid switches built with combinations of more than one type of devices (e.g., SiC MOSFET+Si IGBT).

Figure 7B:
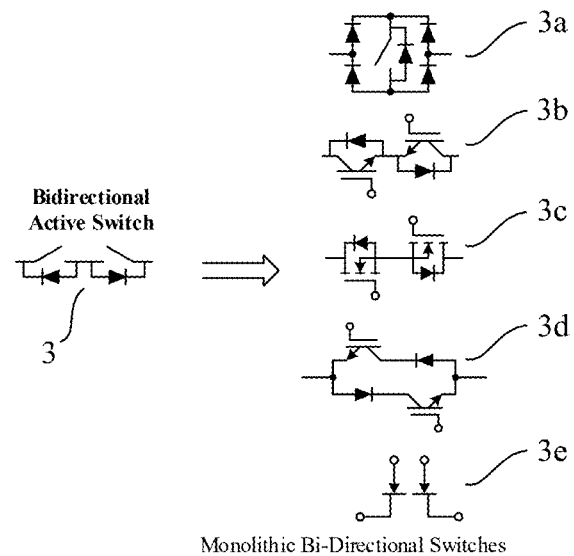

FIG. 7B shows exemplary four-quadrant bidirectional active switches 3, which can withstand both positive and negative voltages and block current in both directions. For example, two IGBTs or two MOSFET are connected in anti-series, or two reverse blocking (RB) IGBTs connected in anti-parallel, or one active switch interconnected with four diodes, or a monolithic bidirectional switch can be employed in the bridge legs of electrical power converter 100. In addition to the abovementioned five types of implementations, any power devices or power device combinations without limitation that can block current in both directions can be adopted as the bidirectional active switch 3 in the bridge legs 13 or 11 of the power converter 100.

Figure 8A:
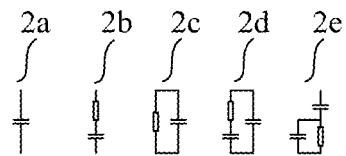
FIGS. 8A and 8B schematically show embodiments of filter network elements that can be used in all filters, i.e., the input, middle, and output filter networks, in an electrical power converter according to an embodiment of the invention.

FIG. 8A shows five variants of possible resistor-capacitor 'RC' network implementations 2a, 2b, 2c, 2d, and 2e for the input filter network 102, the middle filter network 104 and the output filter network 106, which are installed to absorb high frequency harmonics of current. The 'RC' network 2a is a pure capacitor, and the 'RC' network 2b comprises a resistor and a capacitor in series, and the 'RC' network 2c comprises a resistor and a capacitor in parallel, and the 'RC' network 2d comprises a resistor and a capacitor connected in series which is then parallelled with another capacitor, and the 'RC' network 2e comprises a resistor and a capacitor connected in parallel and then series-connected with another capacitor. In addition to the above-mentioned five variants, any configurations of 'RC' filter network suitable for the purpose of attenuating high frequency harmonic currents without limitation can be adopted as variants of the 'RC' network 2.

Figure 8B:
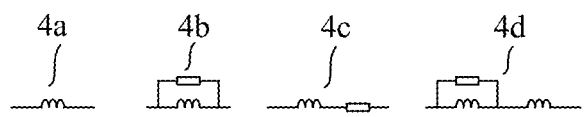

FIG. 8B shows four variants of possible resistor-inductor 'RL' network implementations 4a, 4b, 4c, and 4d for the input filter network 102, the middle filter network 104 and the output filter network 106, including without limitation of any configurations of resistor and inductor such as a single inductor 4a, a resistor and an inductor in series 4b, a resistor and an inductor in parallel 4c and a paralleled resistor and inductor pair in series with another inductor 4d.

Figure 9A:
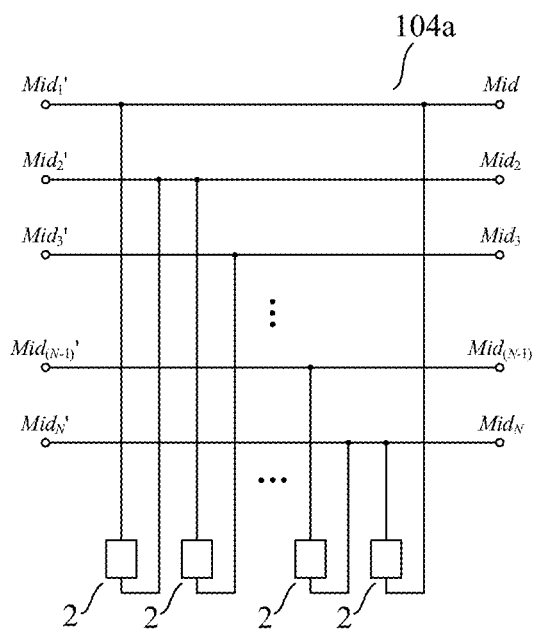
FIGS. 9A, 9B, and 9C schematically show embodiments of the middle filter network in an electrical power converter according to an embodiment of the invention.

FIG. 9 shows three variants of the middle filter network 104. Besides the example filter 104 in FIGS. 1 and 2 which show a 'star' configuration of N 'RC' networks, the N 'RC' networks 2 in FIG. 9A can also be configured as generalized 'delta' configurations 104b, in which N 'RC' networks 2 can be connected in series and the N junctions of the two arbitrary 'RC' networks can be connected to the N phases of the filter.

Figure 9B:
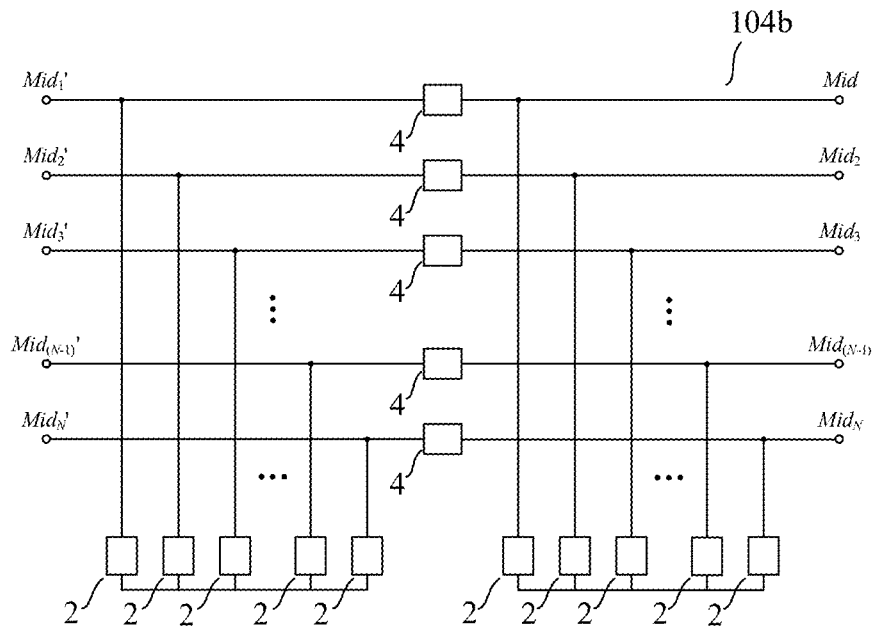
Figure 9C:
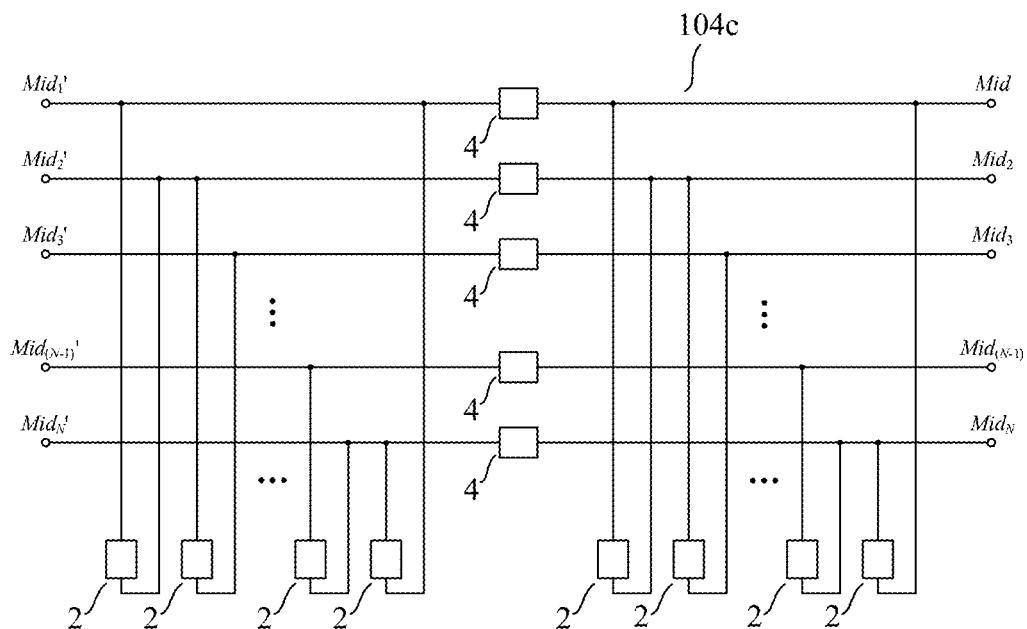

FIGS. 9B and 9C show a 'CLC' configuration of the middle filter network 104, wherein the middle filter network 104c comprises N inductors and two 'star' configurations of N 'RC' networks connected to the output nodes of a first-stage converter 101 and the input nodes of a second-stage converter 103, respectively, and the middle filter network 104d comprises N inductors and two 'delta' configurations of N 'RC' networks.

Figure 10A:
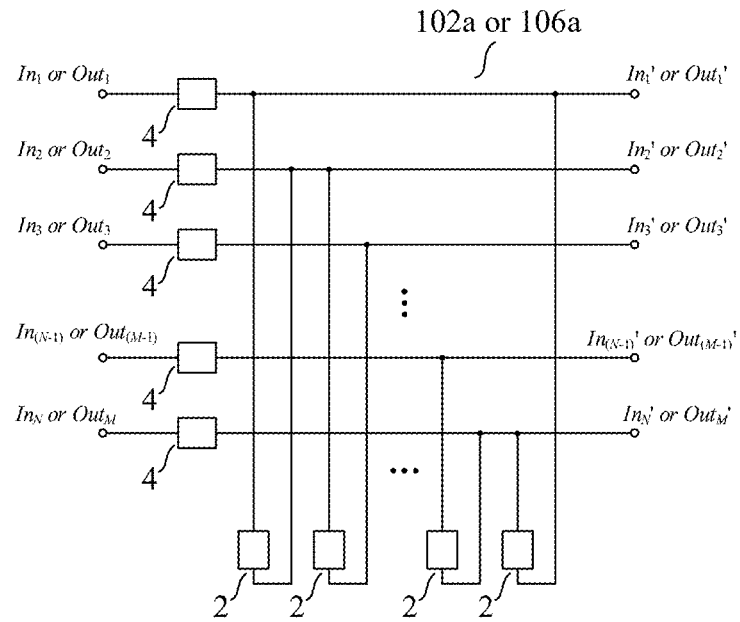
FIGS. 10A, 10B, and 10C schematically show embodiments of the input or output filter network in an electrical power converter according to an embodiment of the invention.
Figure 10B:
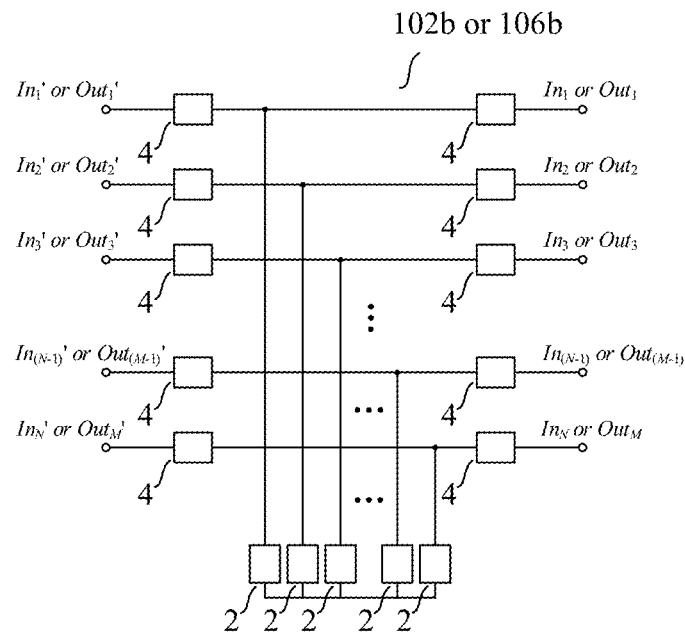
Figure 10C:
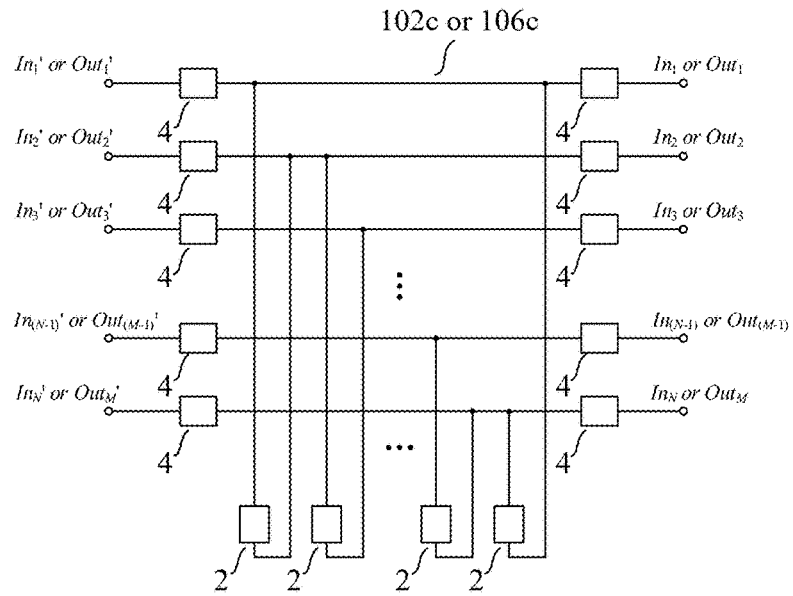

FIGS. 10A-10C show three variants of the input filter network 102 and output filter network 106. In FIG. 10A, N 'RL' networks and N 'RC' networks are connected in the form of an 'LC' filter 102a or 106a, in which N 'RC' networks are connected as the 'delta' configuration, unlike the 'star' configuration in the input filter 102 and output filter 106 of FIG. 1 and FIG. 2.

FIGS. 10B and 10C show an inductor-capacitor-inductor 'LCL' configuration of the input filter network 102 and output filter network 106. In FIG. 10B, N 'RC' networks are connected in the 'star' configuration, while N 'RC' networks in FIG. 10C are connected in the 'delta' configuration.

Figure 11:
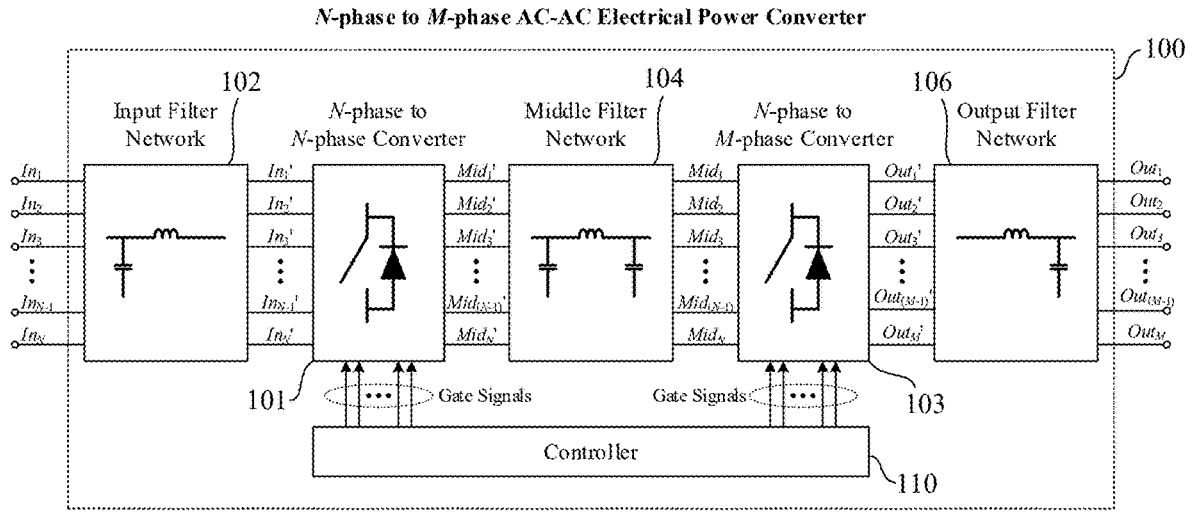
FIG. 11 schematically shows a generalized multiphase to multiphase AC-AC converter according to a further embodiment of the invention.
Figure 12A:
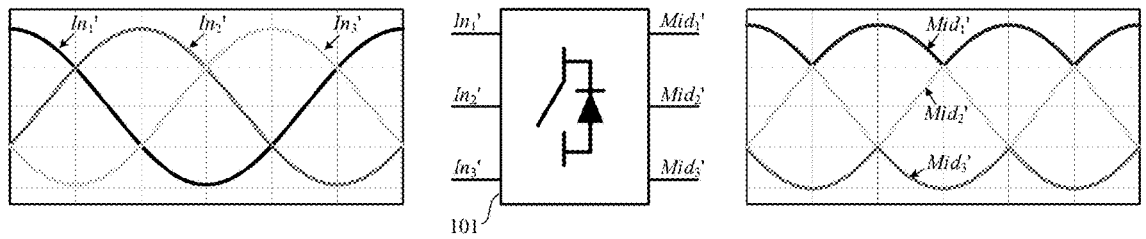
FIG. 12A is a graph showing voltage waveforms from the conversion of a first-stage converter from 3-phase input AC voltages to 3-phase voltages at the middle filter network during a $2\pi$ radian period of the sinusoidal input voltage waveform.
Figure 12B:
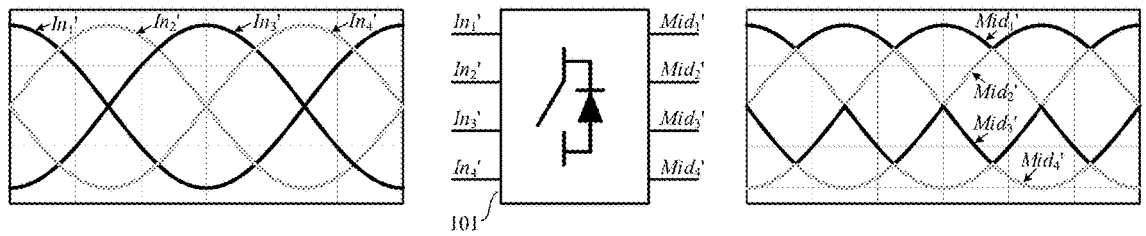
FIG. 12B is a graph showing voltage waveforms from the conversion of a first-stage converter from 4-phase input AC voltages to 4-phase voltages at the middle filter network during a $2\pi$ radian period of the sinusoidal input voltage waveform.
Figure 12C:
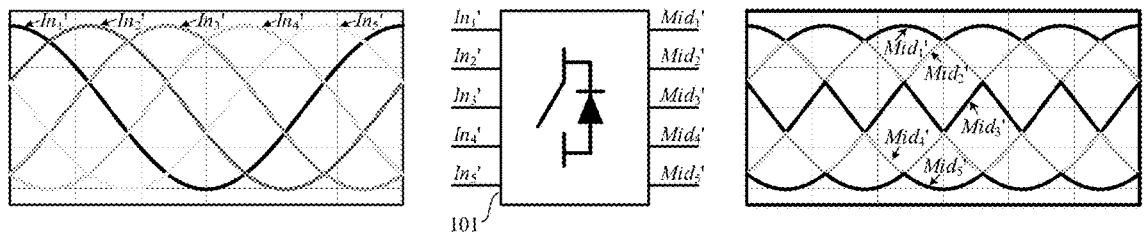
FIG. 12C is a graph showing voltage waveforms from the conversion of a first-stage converter from 5-phase input AC voltages to 5-phase voltages at the middle filter network during a $2\pi$ radian period of the sinusoidal input voltage waveform.
Figure 12D:
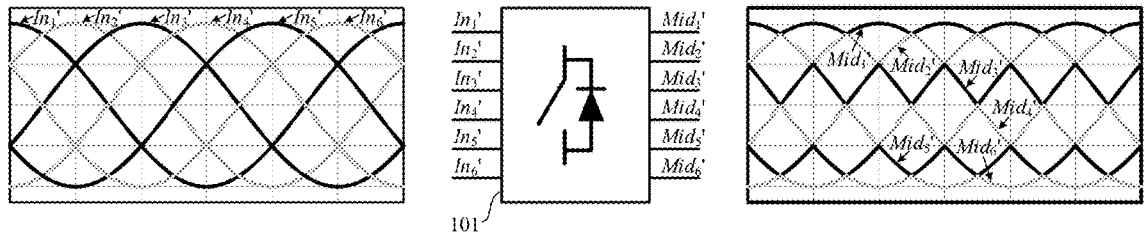
FIG. 12D is a graph showing voltage waveforms from the conversion of a first-stage converter from 6-phase input AC voltages to 6-phase voltages at the middle filter network during a $2\pi$ radian period of the sinusoidal input voltage waveform.
Figure 12E:
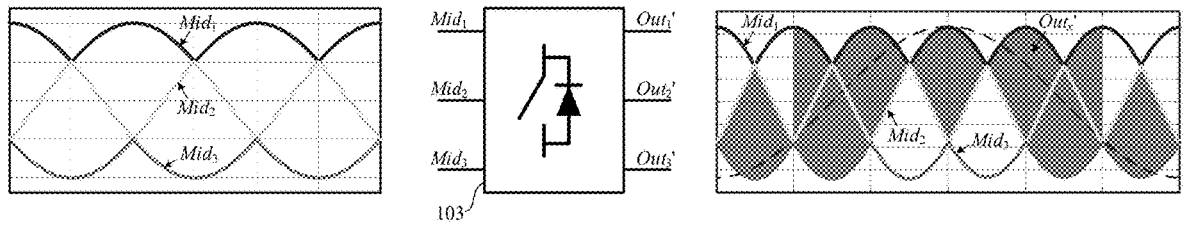
FIG. 12E is a graph showing exemplary voltage waveforms from the conversion of a second-stage converter from 3-phase voltages at the output of the middle filter network to high frequency PWM voltage waveforms at the output of the second-stage converter.

FIG. 11 shows schematically a generic AC-AC electrical power converter 100, which may have a first-stage converter 101 and a second-stage converter 103 as described above, where the gate signals of active switches in converters 101 and 103 are generated and delivered by a switching and/or control scheme implemented in a controller 110. Unlike a multilevel AC-DC converter which produces N-level constant DC voltages, the first-stage converter 101 under the operation of controller 110 arranges the N phase input AC voltages ($u_{In1}$, $u_{In2}$, . . . , $u_{InN}$) in descending order, and connects the phase with the highest voltage to the node $Mid_1$, and the phase with the second highest voltage to the node $Mid_2$, and all the other phases in the same manner, lastly connecting the phase with the lowest voltage to the node $Mid_N$, by closing the corresponding active switches in the bridge legs. For example, in FIG. 12, when N is odd, the outputs of the first-stage converter 101 include (N-1)/2 positive DC voltages, (N-1)/2 negative DC voltages and 1 AC voltage, when N is even, the outputs of the first-stage converter 101 include N/2 positive DC voltages and N/2 negative DC voltages.

The controller 110 also operates the active switches in the second-stage converter 103 using a high-frequency pulse width modulation (PWM) scheme to chop the piecewise voltages across the middle filter. With the PWM switching scheme in action, switching states and their dwell times can be calculated in real time to generate multiphase AC voltages at the outputs of the second-stage converter 103 and multiphase currents at its inputs, according to their references.

Figure 13:
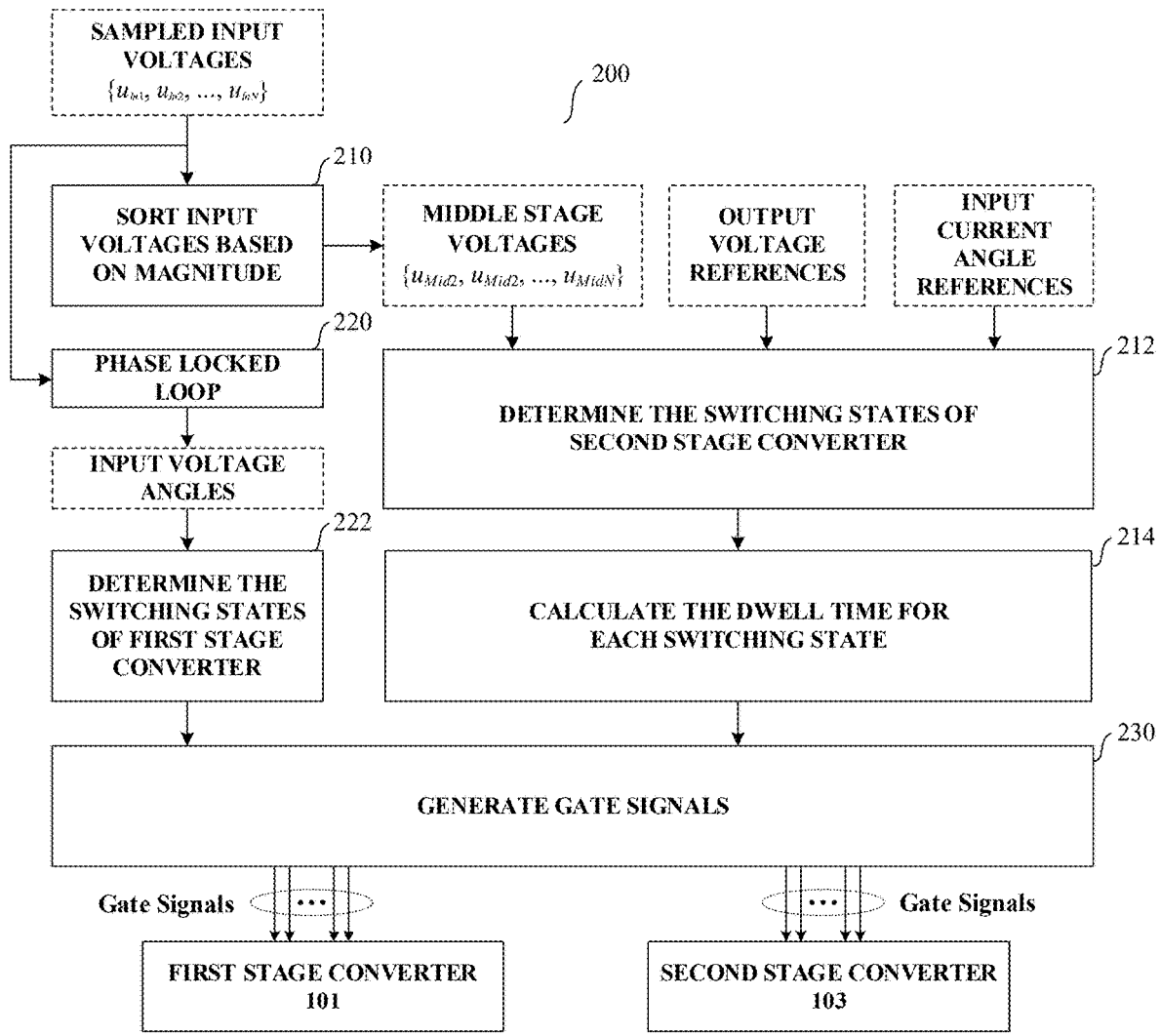
FIG. 13 is a flow diagram illustrating an exemplary process of a switching scheme generating gate signals in the converter controller of FIGS. 1, 2, 3A, 3B, 3C, 3D and 11 for operating the first- and second-stage converters.

FIG. 13 shows a process block diagram of an exemplary switching scheme 200 implemented in a controller 110 for operating the first- and second-stage converters 101 and 103 in the manner as described above. The process takes sampled input voltages and/or output currents and passes them to a voltage sequencer 210 sorting input voltages in descending order to determine the appropriate middle stage voltages. The input voltages are also fed to a phase locked loop 220 to extract their phase angles. With the obtained information of the input voltage magnitudes and angles the switching states of the first stage converter 101 are determined to pass the N phase sorted input voltages to the middle stage at any moment.

For the second stage converter 103, the process takes the middle stage voltages determined by the first stage, the real-time output voltage references and the input current angle references, which are utilized by a switching state generator 212 to determine the switching states of the second stage converter 103 in any switching period. The switching state generator may be implemented by adopting a high-frequency PWM scheme that produces the needed switching states to synthesize the reference output voltages and input currents. The determined switching states are then used together with the above information for a dwell time calculator 214 to calculate the duty cycles and switching patterns for the adopted PWM scheme for switching the second-stage converter 103 to generate the desired output voltages and input power factor.

The middle filter network absorbs high frequency current harmonics while allowing low frequency currents to pass through the first-stage converter. The input filter can further reduce distortions of input currents. If the AC source and the AC load are of the electrical machine type, The input and output filters can be omitted, as the internal inductors of the electrical machine can act as filters to attenuate high-frequency harmonics while allowing low-frequency currents to pass through.

It should be noted that the output voltages of the first-stage converter 101 are piecewise functions of the input voltages, instead of being N constant DC voltages as the 'boosted' outputs of the input voltages by means of conventional switching schemes. The inputs of the second-stage converter 103 serve as voltage stiff points transferred from the AC source of the first-stage converter 101. Therefore, all passive elements in the filters 102, 104, 106 only serve the purpose of filtering of high frequency harmonics, as a result, there is no energy storage element in the electrical power converter 100.

We claim:

1. A dual-stage electrical power converter comprising:
   a first filter comprising:
      a multiple number (N) of input ports configured to:
         interface with an AC power source, each of the multiple number of input ports being associated with a corresponding phase of a voltage generated by the AC power source, the first filter configured to:
      filter, on a per phase basis, each of the inputted voltages of the AC power source to reduce distortions within the inputted voltages; and
      output the filtered voltages to a corresponding first filter output port, wherein the first filter output ports connect to a corresponding input port of an N-port first-stage converter, each first-stage input port connected to one of a plurality (N) of bridge legs, each bridge leg comprising:
         at least one switchable active power device, wherein the first-stage converter is configured to:
            convert the inputted filtered voltages of the AC power source into an intermediate voltage comprising piecewise representations of the filtered voltages, and
            output the intermediate voltage to corresponding one of a plurality (N) of output ports, wherein the N first-stage converter output ports connect to a corresponding input port of an N-port middle filter network, the middle filter network configured to:
      filter, on a per phase basis, the inputted intermediate voltage to absorb high-frequency harmonics; and
      output the filtered intermediate voltage to a corresponding one of a plurality of middle filter output ports, the N middle filter output ports connecting to a corresponding input port of an N input port second-stage converter, the second-stage converter comprising:
   a second plurality (M) of bridge legs associated with each of the second-stage converter input ports, each of the second plurality of bridge legs comprising:
      at least one switchable active power device, wherein the second-stage converter is configured to:
         convert the inputted filtered intermediate voltages from the middle filter network into a desired voltage comprising PWM chopped pieces of the middle filter network voltages; and
      output the desired voltages of each of the second plurality of bridge legs onto a corresponding second plurality of outputs, the second plurality of outputs connected to a corresponding input port of an M-phase output filter network, the output filter network configured to:
   filter the received desired voltages to absorb high frequency; and
   output the filtered desired voltages onto a corresponding one of a second plurality of output ports; and
   a controller configured to:
      sample the voltages and currents of the first-stage converter and the second-stage converter; and
      produce one or more gate signals for switching the switchable active power devices in the first-stage converter and the second-stage converter, wherein N≥=3 and M≥=3.

2. The dual-stage electrical power converter of claim 1, wherein the bridge legs in the first-stage converter and the second-stage converters comprise: two power devices, being one of active switches or diodes configured in the form of a half bridge circuit and connected between a first input port and an $N^{th}$ port of one side of the middle filter network, and bidirectional active switches connected respectively to ports between the first input port and the $N^{th}$ input port of a same side of the middle filter network.

3. The dual-stage electrical power converter of claim 1, wherein the bridge legs in the first-stage converter and the second-stage converter are at least one of: bidirectional neutral-point clamped multi-level bridge legs, unidirectional neutral-point clamped multi-level bridge legs, bidirectional active neutral-point clamped multi-level bridge legs and unidirectional active neutral-point clamped multi-level bridge leg.

4. The dual-stage electrical power converter of claim 1, wherein the bridge legs of the first-stage converter and the second-stage converter are the same or different.

5. The dual-stage electrical power converter of claim 1, wherein the middle filter network comprises: one or more capacitor and inductor elements forming N-phase C-L-C structures, interconnecting the N output ports of the first-stage converter and the N input ports of the second-stage converter with the N input and output ports, respectively of the middle filter network.

6. The dual-stage electrical power converter of claim 1, wherein the first, middle, and output filter networks adopt combinations of: series and parallel connected inductors and resistors, and series and parallel connected capacitors and resistors.

7. The dual-stage electrical power converter of claim 1, wherein the bridge legs employ different combinations of switchable power semiconductors devices and diodes, having one of Silicon, Silicon Carbide or Gallium Nitride composition.

8. The dual-stage electrical power converter of claim 1, wherein the controller is configured to arrange the input voltages in descending order.

9. The dual-stage electrical power converter of claim 1, wherein a number of the plurality (N) of input ports equals a number of the second plurality (M) of output ports.

10. The dual-stage electrical power converter of claim 1, wherein a number of the plurality (N) of input ports is not equal to a number of the second plurality (M) of output ports.

11. The dual-stage electrical power converter of claim 1, wherein the one or more gate signals comprise pulse width modulated (PWM) signals.

12. A method for converting multiple phases of input AC signals into multiple phases of output AC signals, the method comprising:
   (a) filtering N-phase AC input signals utilizing filter elements, wherein said filter elements comprise at least one of: capacitors and inductors;
   (b) converting the filtered N-phase AC input signals, utilizing a multiple input port first-stage converter having N bidirectional or unidirectional bridge legs utilizing switchable power devices and diodes and outputting the converted filtered N-phase AC input signal on N corresponding output ports;
   (c) filtering the converted filtered N-phase AC input signal outputs of the first-stage converter by a middle filter network comprising capacitor and inductor circuit elements, and outputting the filtered converted filtered N-phase AC inputs on corresponding N output ports;
   (d) converting the output signals of the middle filter network into second converted signal utilizing a second-stage converter having M bidirectional bridge legs utilizing switchable power devices and diodes, each having N input ports and connecting to one of corresponding output ports, wherein the second converted are outputted on M second converter output ports;
   (e) filtering the M second converted output signals from the second-stage converter utilizing filter elements, wherein said filter elements comprise at least one of: inductors and capacitors;
   (f) controlling one or both of: a) output voltages and b) input currents of the first- and second-stage converters by executing a program that implements at least one of: a switching scheme and a control scheme to produce one or more gate signals for switching each of the switchable power devices in the first- and second-stage converters, producing multiple phases of the output AC signal, wherein N≥=3 and M≥=3.

13. The method of claim 12, wherein the switching and/or control scheme utilizes one or both of sampled input voltages and output currents of the first- and second-stage converters to produce real-time gate signals to operate the switchable power devices, with which a first-stage converter is operated under a fundamental frequency switching mode, arranging the input voltages in descending order and producing piece-wise sine waves to the middle filter network, while the second-stage converter is operated under a high frequency switching mode to chop the piece-wise sine waves from the middle stage to produce high frequency PWM output voltage and input current waveforms.

14. A dual-stage electrical power converter comprising: a multiple number of input ports for interfacing with an AC power source generating a plurality of voltages of different phases, wherein the plurality of voltages are arranged in descending order, and connect to a corresponding first filter input, and each corresponding first filter output connects to a corresponding phase input of a first-stage converter, having therein corresponding bidirectional bridge legs, each bridge leg having switchable active power devices and having an output, the output provided as an input to a corresponding input port of a middle filter network, the middle filter network having a same number of input ports as the first-stage converter wherein each middle filter output port providing an input to a second-stage converter having a same number of inputs ports as the multiple ports of the first-stage converter, said second-stage converter having therein bidirectional bridge legs each having switchable active power devices and providing an output to a corresponding input port of an output filter network, the output filter network ports and connecting to an AC load of multiple phases (M), and a controller for sampling at least the output voltages of the first- and second-stage converters to produce one or more gate signals for switching the switchable active power devices in the first- and second-stage converters, wherein the first-stage converter is operated in a fundamental frequency mode to produce piece-wise signals and the second-stage converter is operated under a high frequency switching mode to chop the piece-wise signals to produce high frequency PWM output voltage and input current waveforms.

15. A dual-stage electrical power converter comprising:
   a first stage converter, comprising N input ports, the N input port first-stage converter configured to:
     receive an input voltage, each first-stage input port connected to a plurality (N) of bridge legs, each bridge leg comprising:
   at least one switchable active power device, wherein the first-stage converter is configured to:
     convert the voltage received on a corresponding one of the plurality (N) of input ports into an intermediate voltage, the intermediate voltage comprising piece-wise representations of the input voltage received on a corresponding one of the input ports, and
     output the intermediate voltage to corresponding one of a plurality (N) of first stage converter output ports;
   a middle filter network configured to:
   receive, on a corresponding one of a plurality (N) of middle filter input ports, a corresponding intermediate voltage;
   filter the received intermediate voltage to absorb high-frequency harmonics; and output the filtered intermediate voltage to a corresponding one of a plurality of middle filter output ports;

an N-input port second-stage converter, the second-stage converter comprising:

a plurality (N) input ports configured to receive a corresponding one of the filtered intermediate voltages;

a second plurality (M) of bridge legs associated with each of the second-stage converter plurality of input ports, each of the second plurality of bridge legs comprising:

at least one switchable active power device, wherein the second-stage converter is configured to:

convert the filtered intermediate voltage received from the middle filter network on corresponding second stage converter input ports into a desired voltage, the desired voltage comprising PWM chopped pieces of the filtered intermediate voltages;

and output the desired voltages of each of the second plurality of bridge legs onto a corresponding second plurality of second stage converter output ports, and a controller configured to:

sample the voltages on the output ports of the first-stage converter and the second-stage converter; and produce one or more gate signals for switching the switchable active power devices in the first-stage converter and the second-stage converter.

16. The dual-stage electrical power converter of claim 15, further comprising:

an input filter comprising:

a multiple number (N) of input ports configured to:

interface with an AC power source, each of the multiple number of input ports being associated with a corresponding phase of a voltage generated by the AC power source, the input filter configured to:

filter each of the inputted voltages of the AC power source to reduce distortions within the inputted voltages; and output the filtered voltages to a corresponding input filter output port, wherein the input filter output port connects to a corresponding one input port of the multiple number of input port of the-port first-stage converter.

17. The dual-stage electrical power converter of claim 15, further comprising:

an M-port output filter network comprising:

a M input ports connected to a corresponding output port of the second-stage converter, output filter network configured to:

receive the desired voltage;

filter the received desired voltages to absorb high frequency; and output the filtered desired voltages onto a corresponding one of M output ports.

* * * * *